Jan. 12, 1926.
C. E. GILBERT
IMPLEMENT ATTACHMENT FOR TRACTORS
Filed Sept. 22, 1924
1,569,011
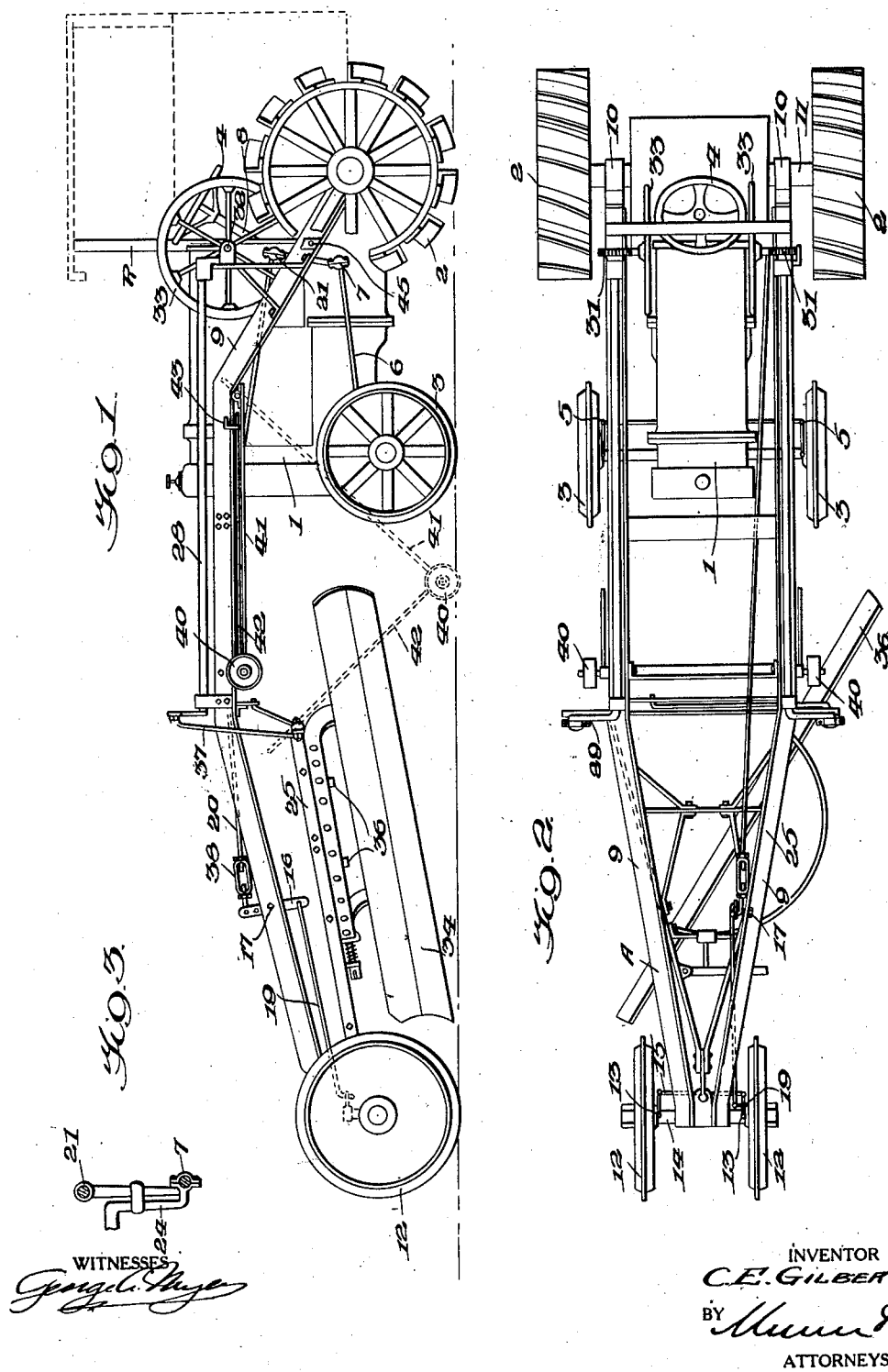
INVENTOR
C.E. GILBERT,
BY
ATTORNEYS Patented Jan. 12, 1926.

1,569,011

UNITED STATES PATENT OFFICE.

CLARENCE E. GILBERT, OF ABERDEEN, SOUTH DAKOTA.

IMPLEMENT ATTACHMENT FOR TRACTORS.

Application filed September 22, 1924. Serial No. 739,163.

*To all whom it may concern:*

Be it known that I, CLARENCE E. GILBERT, a citizen of the United States, and a resident of Aberdeen, in the county of Brown and State of South Dakota, have invented a new and useful Improvement in Implement Attachments for Tractors, of which the following is a full, clear, and exact description.

My invention relates to improvements in implement attachment for tractors, and more particularly that type of attachment which permits the placing of the implement in front of the tractor, and it consists in the combinations, constructions, and arrangements herein described and claimed.

An object of my invention is to provide an implement attachment of the character described that may be quickly and easily attached or removed from the tractor, without the necessity of lifting or moving about the relatively heavy parts of the attachment by the use of extraneous mechanism.

A further object of my invention is to provide an implement attachment of the character described which may be attached to the ordinary type of farm tractor without the necessity of altering the construction of the tractor.

A further object of my invention is to provide an implement attachment of the character described in which the implement is disposed in front of the tractor so that the operator may keep careful watch of the implement and thus manipulate the implement as well as the controlling levers of the tractor. This particular structure obviates the necessity of having an operator for the implement and one for the tractor as in the case of many of the ordinary types of drawn implement attachments, which of course are disposed at the rear of the tractor.

A further object of my invention is to provide an implement attachment of the type described in which a carriage is virtually provided and supported by the tractor at one end and a pair of wheels at the forward end arranged to turn with the fore wheels of the tractor.

A further object of my invention is to provide a novel means for operating the fore wheels of the implement attachment simultaneously with the fore wheels of the tractor, so that the entire combination may be easily steered in its course.

Other objects and advantages will appear in the following specification, and the novel features of the invention will be particularly pointed out in the appended claims.

My invention is illustrated in the accompanying drawings forming part of this application, in which—

Figure 1 is a side elevation of an embodiment of my invention applied to the ordinary type of grader implement, Figure 2 is a top plan view of the mechanism shown in Fig. 1, and Figure 3 is a fragmentary view of a portion of the steering mechanism of the tractor.

In carrying out my invention I make use of the ordinary type of tractor 1 which has rear driving wheels 2 connected through suitable transmission to the engine of the tractor 1 and a pair of fore wheels 3 provided with a steering mechanism controlled by a steering wheel 4 adjacent to the driver's seat of the tractor.

The steering mechanism for operating the fore wheels 3 of the tractor comprises the ordinary type of spindle connecting rod 5 connected between the spindles of the fore wheels 3. A steering gear connecting rod 6 connected with the spindle rod by a ball and socket joint at one end and at the other end 7 with a steering gear post 8 at the lower end thereof so that rotation of the steering post 8 by means of the wheel 4 may occasion an oscillating movement of the connecting rod 6 therefor, and therefore turn the wheels 3.

My improved tractor attachment consists in the provision of a frame A consisting of a pair of arched beams 9 arranged to be removably clamped at 10 to the rear axle housing 11 of the tractor. A pair of fore wheels 12 are rotatably mounted upon spindles 13 supported upon a shaft 14. The spindles 13 are connected by a spindle connecting rod 15 similar to the rod 5.

Means for synchronizing the movement of the wheel 3 and the wheel 12 so that when the wheels 3 are turned by means of the steering wheel 4, the wheel 3 may turn proportionately, is provided in the following mechanism. A rocking beam 16 is pivotally mounted at 17 to one of the beams 9. The lower end of this beam 16 is connected by means of a rod 19 to the adjacent arm 19 of the spindle 13, closest to the rocker arm 16.

The opposite end of the rocker arm 16 is connected by means of an adjustable rod 20 to a ball and socket joint 21 forming a part of an extension member 22 fixed at its other end to the lower portion of the steering post assembly 8 so that movement of the steering post 8 may occasion longitudinal movement of the rod 20 as well as the rod 6. It should be noted that the ball and socket joint 21 is on the opposite side of the fulcrum of the member 22 from the ball and socket joint 7 so that when the joint 7 moves forwardly the socket 21 will move rearwardly. This is due to the fact that the lower portion of the steering post assembly 8 is in the form of a bell crank extending downwardly (see Figure 3, as shown at 24.

Means for rendering the frame A especially rigid at its rearward end, (i. e., the end adjacent to the tractor), so that no warpage of the frame may occur when in use, is provided in a reenforcing arch R secured at its lowermost ends 45 to the beams 9. This arch is sufficiently high to permit the tractor to pass thereunder and may be used to advantage to form the partial support of a driver's cab, as shown at dotted lines 46 in Figure 1.

It is highly necessary that there be practically no warpage of the frame A, hence the arch R; since to permit movement of the beams 9 of the frame except as a unit would utterly defeat the utility of my improved implement attachment when used to support a grading device.

A depending supporting frame 25 is carried by the arched beams 9 and suspended therefrom in such a manner as to permit the lifting or lowering of the frame 25. Means for lifting the frame 25 from either side so that it may be tilted or so that both sides may be lifted simultaneously is provided in a pair of shafts 27 and 28 running lengthwise of the arched beams 9 respectively, and each having a bell crank portion 29 and 30 respectively at their forward ends. The inner ends of the shafts 27 are connected by means of gears 31 thereupon with worm gears carried by the shaft portion 32 of a pair of operating wheels 33 rotatably supported upon the arched beams 9. There are two of these wheels 33 one for each of the shafts 27 and 28 respectively, so that movement of the wheels may occasion a rotative movement of the shafts 27 and 28 respectively, and thereby movement of the bell crank portions 29 and 30. Each of the bell cranks 29 and 30 respectively is connected to one of the sides of the frame 29 so that selective operation of the shafts 27 and 28 may occasion the tilting of the frame 25 at the will of the operator.

An implement such as a grader blade 34 is secured to the frame 25 by means of bolts 36. This grader blade is only one of the many implements which may be supported by the frame 25.

Means for supporting the rearward end of the frame A when the tractor 1 is not connected thereto and for slightly raising the rearward end of the frame during the process of coupling and uncoupling of the tractor is provided in a pair of auxiliary wheels 40 rotatably mounted upon a drop frame 41 which is pivotally connected to the beams 9 at its uppermost end. This drop frame 41 may be moved substantially parallel with the frame A when not in use as shown in full lines in Figure 1, and dropped to the position shown in dotted lines when ready for use.

The drop frame 41 is further provided with a pair of struts 42 pivotally connected thereto adjacent to the wheels 40. The opposite ends of the struts 42 are provided with gripping members 43 slidably mounted thereon as shown in Figure 1. These gripping members are arranged to engage with the adjacent or rearward end of the supporting frame 25, so that movement of the frame 25 downwardly as by operation of the wheels 33 will force the wheels 40 down upon the road and hence raise the frame A.

From the foregoing description of the various parts of the device, the operation thereof may be readily understood. Let us assume that it is desired to grade a road bed with the device illustrated in Figure 1. The operator will take his position adjacent the steering wheel 4 and set the tractor in operation. If the blade 34 is not in its proper position relative to the road bed to be graded, the elevation of either side of the blade 34 may be brought about by movement of the wheels 33. For instance, if the rearward end of the blade, as shown at 36, is too low, the wheel 33 is manually manipulated so that the shaft 28 may turn and cause the bell crank 30 to elevate sufficiently to draw up the left-hand side of the frame 25 as viewed in Figure 1. It will be noted that the connecting rods 37 are employed for connecting the bell cranks 29 and 30 to the respective sides of the frame 25.

It it is desirous to turn the entire device, as in steering the device along the road bed, it is merely necessary to actuate the single steering wheel 4, thereby causing the wheels 3 to turn upon their spindles and simultaneously the wheels 12 will turn upon their spindles 13. The wheels 3 and 12 will turn in the same direction due to the fact that the rocker arm 16 will move forwardly when the bell crank 24 of the steering post assembly moves forward.

If it is desired to adjust the relation of the steering wheels 3 and 12 to one another, as in the case of a disalignment, the turn buckle 38, forming a part of the rod 20, may be actuated to shorten or lengthen the rod.

In coupling and uncoupling my improved attachment for tractors, to and from the tractor 1, I employ the drop frame 41 in precisely the same manner set forth in the description of this part of the attachment. The use of this means for raising and supporting the rearward end of the frame A greatly shortens the time and labor ordinarily required to couple and uncouple attachments of somewhat similar character, such as the numerous drawn types of implement attachments.

The provision of the arch R assures the utmost rigidity of the frame A and hence efficient use of the device as a grader. The incidental utility of the arch R is that of providing adequate support for the structure of a cab for the purposes of shelter.

It should also be noted that while I have here described my improved implement attachment for tractor as adapted for connection with a wheeled tractor, that any engine of locomotion may be employed to move the frame and that the frame 9 may be used to support a load and thus take the place of a trailer, as well as to support implements. Obviously such modifications of my invention are well within the spirit and scope thereof.

I claim:

1. An implement attachment of the type described comprising a frame, wheels for supporting the forward ends of said frame, and means at the opposite end of said frame for engagement and support upon an engine of locomotion, a movable implement supporting member carried by said frame, means for elevating and lowering said implement supporting member manually, a drop frame pivotally mounted upon said frame intermediate its length, auxiliary supporting wheels carried by said drop frame and arranged to rest upon the ground when the drop frame is pivoted downwardly, a strut pivotally connected to said drop frame adjacent to its outer end, and a gripping member carried by said strut arranged to engage with said movable implement supporting member, whereby movement of said supporting member may occasion movement of said drop frame to elevate or lower the rearward end of said implement attachment at will.

2. An implement attachment of the type described comprising a frame, wheels for supporting the forward ends of said frame and means at the opposite end of said frame for engagement and support upon an engine of locomotion, a movable implement supporting member carried by said frame, means for elevating and lowering said implement supporting member manually, a drop frame pivotally mounted upon said frame intermediate its length, auxiliary supporting wheels carried by said drop frame and arranged to rest upon the ground when the drop frame is pivoted downwardly, a pair of struts pivotally connected to said drop frame adjacent its outer end, and a pair of gripping members carried by said struts arranged to engage with said movable implement supporting member, whereby movement of said supporting member may occasion movement of said drop frame to elevate or lower the rearward end of said implement attachment at will.

3. In an implement of the type described, a frame, wheels disposed at the forward end of said frame for supporting that end, a manually actuated movable implement supporting member carried by said frame, means carried by the rearward end of said frame for clamping the reaward end thereof upon an engine of locomotion, a drop frame pivotally mounted on said frame intermediate its length, auxiliary supporting wheels carried by the lower end of said drop frame and arranged to rest upon the ground when said drop frame is lowered, a pair of struts pivotally connected to said drop frame adjacent to its outer end, and gripping members slidably mounted on said struts and arranged to engage with said movable implement supporting member, whereby movement of said supporting member may occasion movement of said drop frame.

4. In an implement of the type described, a frame, wheels disposed at the forward end of said frame for supporting that end, a manually actuated movable implement supporting member carried by said frame, means carried by the rearward end of said frame for clamping the rearward end thereof upon an engine of locomotion, a drop frame pivotally mounted on said frame intermediate its length arranged to rest upon the ground when said drop frame is lowered, a pair of struts pivotally connected to said drop frame adjacent to its outer end, and gripping members slidably mounted on said struts and arranged to engage with said movable implement supporting member, whereby movement of said supporting member may occasion movement of said drop frame.

CLARENCE E. GILBERT.